Feb. 2, 1954 G. E. BATCHELDER 2,667,784
PISTON METER

Filed Nov. 16, 1950 2 Sheets-Sheet 2

INVENTOR
GEORGE E. BATCHELDER

BY Strauch, Nolan & Diggins
ATTORNEYS

Patented Feb. 2, 1954

2,667,784

UNITED STATES PATENT OFFICE 2,667,784

PISTON METER

George E. Batchelder, Pittsburgh, Pa., assignor to Rockwell Manufacturing Company, Pittsburgh, Pa., a corporation of Pennsylvania Application November 16, 1950, Serial No. 195,964

5 Claims. (Cl. 73—247)

This invention relates to fluid meters and more particularly to piston type displacement meters for accurately measuring and delivering fluid under an extended range of operating conditions.

In meters of this kind, which are essentially fluid operated motors, it has been found necessary to provide a calibration device for adjusting the meter to provide the necessary precise correlation between the number of revolutions of the register element and the quantity of fluid flowing through the meter.

This calibration may be effected by the use of a relatively complicated, expensive compensated drive between the motor and the register element, or by adjustment of the quantity of fluid passing through the meter per motor revolution. The present invention is primarily concerned with improvements in the latter type of adjustment, an example of which is disclosed in U. S. Patent 1,949,006. Such a calibration unit may take the form of a free piston reciprocably mounted in a cylinder which is in fluid communication with the motor pistons. The calibration piston is actuated by the pressure differential between the inlet and outlet sides of the motor and periodically expels a calibrated amount of fluid in addition to that discharged by the motor pistons.

As is universally the case in prior developments, the diameter of the calibration piston disclosed in U. S. Patent 1,949,006 is relatively small with respect to its thickness. That is, the area over which the actuating pressure is effective, is relatively small and the frictional resistance to movement is relatively large with the result that differential pressure existing under conditions of low flow may be insufficient to move the piston through its full stroke and where foreign particles are present in the fluid the frictional resistance to movement of the calibration piston is often sufficient to prevent any movement of the piston. To overcome this difficulty it has been the practice to maintain a loose fit between the calibration piston and its cylinder. However, this permits an appreciable amount of fluid to leak past the piston rendering the unit totally ineffective for precision calibration.

In accordance with the present invention a calibration piston is provided which has a diameter much greater than its thickness so that the effective actuating force will be appreciably increased and the opposing frictional resistance to movement will be minimized. To further increase the effectiveness of the meter and the calibration unit, the latter is arranged in true fluid parallelism with respect to the motor pistons. That is, the calibration piston and the motor pistons are arranged in separate fluid circuits which are connected alternately to a pressure source and an exhaust outlet by a common valve through passages of substantially equal length. This construction assures movement of the calibration piston through its full, relatively short, stroke at or before completion of the stroke of the meter pistons.

Accordingly, it is a major object of the present invention to provide a fluid meter which may be calibrated effectively over a wide range of operating conditions and particularly under low flow and pressure conditions.

It is a further object to provide a novel calibration unit for a piston meter.

It is also an object to provide a novel fluid circuit for a calibration unit.

It is a more specific object to provide a relatively large calibration piston which is incorporated in a fluid meter without substantial increase in the size of the meter.

It is also an object to provide a novel calibration unit for a fluid meter having a minimum number of compactly arranged structurally rugged, low cost components.

It is an additional object to provide a novel adjusting means for a calibration unit which is readily accessible and extremely simple in design.

Additional objects and advantages will become apparent as the description proceeds in connection with the accompanying drawings in which:

Figure 3 is an end elevation of the calibration device;

Figure 1:
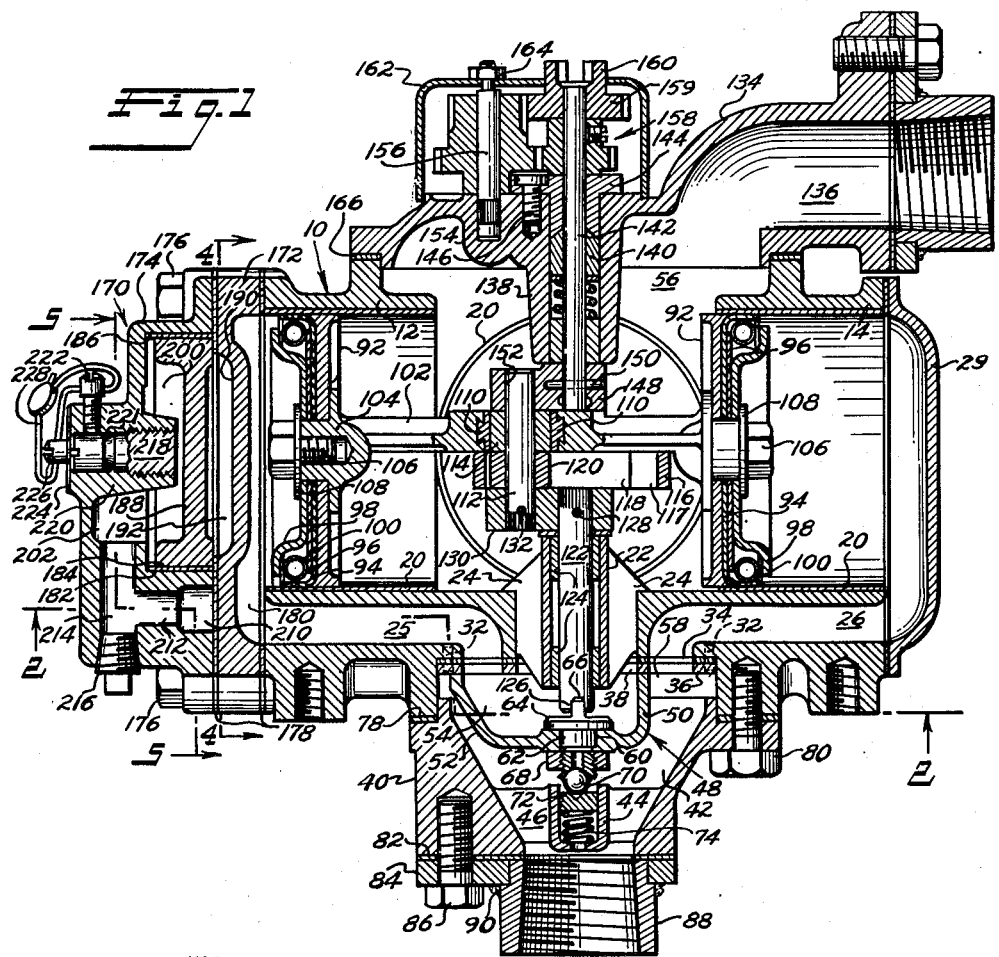
Figure 1 is a central vertical section through a pair of the piston cylinders showing the means for operatively connecting the pistons with the fluid inlet and outlet control valve and the register drive mechanism.

Referring in further detail to the drawing, for the purpose of the present explanation, I have shown the meter body 10 in the form of a die cast aluminum cylinder block having four horizontally disposed cylinders 12, 14, 16 and 18 spaced 90° apart. A brass liner sleeve 20 is pressed into each cylinder. Between the cylinders at the side thereof and coaxial with the vertical center line of the meter body a bearing sleeve 22 is integrally connected with the cylinder wall by spaced webs 24. The wall of cylinder 12 at the lower side thereof is provided with a longitudinally extending passage 25 opening downwardly at its inner end through the cylinder wall and in communication at its outer end with the outer end of cylinder 12. Similar passages 26, 27 and 28 are provided in the walls of cylinder 14, 16 and 18, respectively. The outer end of each of the cylinders 14, 16 and 18 is closed by a pressed steel head 29 secured thereto as by cap screws 30.

In the cylinder block between the inner ends of passages 25, 26, 27 and 28, dowel pins indicated at 32 are inserted to accurately locate a gasket 34 and a valve seat plate 36. The plate 36 is provided with four circumferentially extending slots or openings which register with the inner ends of the passages 25, 26, 27 and 28 in the walls of the respective cylinders, said plate also having a central circular opening 38 which registers with the annular space between the bearing sleeve 22 and the cylinder wall.

A bottom cover member 40 has an upwardly flaring fluid inlet passage 42 and at the lower end thereof an axially disposed upwardly opening bearing socket 44 connected with the wall of passage 42 by a plurality of radial webs 46.

The valve assembly comprises a rotary valve member 48 which is centrally formed with a hollow cylindrical portion 50 having a quadrant shaped section 52 to register with the slot in the valve seat plate 36 and providing a fluid outlet receiving chamber 54 in constant communication with the central opening 38 in said plate and with the interior of the meter body or the cylinder block which forms a common fluid outlet receiving chamber 56 for the four piston cylinders.

At the upper open side of the chamber 54, valve member 48 is provided at diametrically opposite sides thereof with flanges 58 extending circumferentially from the ends of the quadrant shaped portion 52 of chamber 54 and terminating in spaced relation from each other to provide a space or recess which is substantially equal to the length of the slot in the valve seat plate 36.

The lower end wall of the cylinder portion 50 of the valve member is provided with an axially centered cylindrical opening 60 in which a coupling member 62 is inserted, said member at its upper end having a head or flange 64 provided with a male coupling part 66. The lower end of member 62 is threaded and receives a nut 68 whereby said member is securely held against rotation or axial displacement relative to the valve member 48.

The lower end face of member 62 has a concave seat for a stainless steel ball-bearing 70 disposed in the upper open end of the socket 44 upon a cap plate 72 on the upper end of a coil spring 74 which rests on the lower wall of the socket 44.

The cover member 40 is rigidly secured to the cylinder block upon a gasket 78 by suitable cap screws 80. A gasket 82 and a connecting flange 84 are secured to the lower surface of the cover plate 40 by the cap screws 86 and an internally threaded pipe coupling member 88 is received within the flange 84 and secured thereto as by a brazing 90.

Each of the cylinders 12, 14, 16 and 18 contains a reciprocating piston which comprises a piston head 92, a cup leather 94, spacing plate 96, piston skirt 98, and an annular coil spring 100 between the skirt 98 and the free edge of cup leather 94.

The diametrically opposed pair of pistons in cylinders 12 and 14 are rigidly connected by a top scotch yoke rod 102. The ends of rod 102 are formed with internal threaded bosses 104 disposed in axially centered openings in the respective piston heads 92 to receive locking screws 106 which, with washers 108, secure the piston elements in assembled relation to the rod 104. Hardened wear-resistant steel inserts 110 are rigidly mounted in an elongated slot in the rod 102 to receive a crank pin 112 and a roller 114 loosely mounted thereon. A similar bottom scotch yoke rod 116 rigidly connects the pistons in the cylinders 16 and 18. The crank pin 112 extends downwardly through an elongated slot 117 in the rod which is provided with hardened steel inserts 118 in which a second roller 120 loosely mounted on the crank pin is received.

A valve operating shaft 122 is journalled in bushing 124 press fitted in the upper and lower ends of the sleeve 22. At its lower end, the shaft 122 is provided with a slot 126 which receives the male lug 66 on the upper end of member 62. At its upper end, the shaft 122 is non-rotatably connected by a pin 128 to one end of a crank arm 130. The lower end of crank pin 112 is non-rotatably connected to the other end of crank arm 130 by a pin 132.

The top cover member 134 for the cylinder block is adjustably secured to the block by any suitable means such as cap screws (not shown) and is formed with extending outlet neck 136, in communication with the chamber 56 of the meter body. The cover member 134 is formed with an axially centered depending boss 138 having a stuffing box 140 for a register drive shaft 142. The stuffing box gland 144 has a flanged end secured to the upper surface of the cover member 134 by screws 146. To the lower end of shaft 142, one end of a crank arm 148 is non-rotatably fixed by a pin 150, the other end of the crank arm being provided with an opening 152 to rotatably receive the upper end of the crank pin 112.

In laterally spaced relation from the shaft 142, cover member 134 is formed with a vertical bore 154 into which the lower end of a stationary shaft 156 is pressed. Upon this shaft and the upper end of shaft 142, speed reduction gearing, generally indicated at 158, is mounted, the final element 159 of the gear train being rotatable relative to shaft 142 and provided with an upwardly projecting coupling element 160 for engagement with a register shaft (not shown). The gearing is enclosed in housing member 162 which is secured in fixed relation to the cover member by nut 164 threaded upon the upper end of the stationary shaft 156.

When the cover assembly is positioned over the chamber 56 in the cylinder block, the position of crank arm 148 is adjusted so that the upper end of the crank pin 112 will be rotatably received in the opening 152 in the arm and with the register drive shaft 142 in coaxial alignment with the valve operating shaft 122. Since shaft 142 is centered in the cover member, the cover may be adjusted about the shaft axis to dispose the outlet 136 in any desired radial position with respect to the shaft and the meter cylinders. A gasket 166 is disposed between the cylinder block and the cover member to assure positive sealing between these components.

Referring now to the calibration unit for the meter indicated generally at 170, a cylinder head 172 and a cover plate 174 are rigidly secured to the outer end of cylinder 12 as by cap screws 176. Suitable gaskets 178 are interposed between the elements to seal the cylinder 12 and to provide a sealed chamber between the cylinder head 172 and cover 174.

Free communication is established between the outer end of cylinder 12 and the passage 25 through an annular recess 180 formed in the inner surface of cylinder head 172 with a lower enlarged portion in register with the passage 25. A cylindrical recess 182 in axial alignment with cylinder 12 in cover plate 174 receives a tubular brass liner 184 which is locked in place by a rolled edge 186. A lightweight calibration piston 188, preferably of graphite is positioned for free reciprocation with a close fit within the liner 184 between the head 172 and bottom of the recess 182. It is a feature of the invention that the diameter of the piston 188 is relatively large with respect to its thickness. As illustrated, the diameter to thickness ratio is approximately 3 to 1, a construction found in practice to produce very satisfactory operation. It is to be understood that requirements of particular installations may dictate the use of different ratios. However, the effectiveness of the piston for full range operation is seriously decreased by employing a diameter to thickness ratio of less than 1.5 to 1. It will be appreciated that a piston of this design will expel a comparatively large volume of fluid when moving through a very short stroke thus permitting the unit to be extremely compact. The outer surface of the head 172 is provided with a central circular dished recess 190 opposite a similar shallow recess in the adjacent space of the piston 188 to form an expansible chamber 192.

Figure 2:
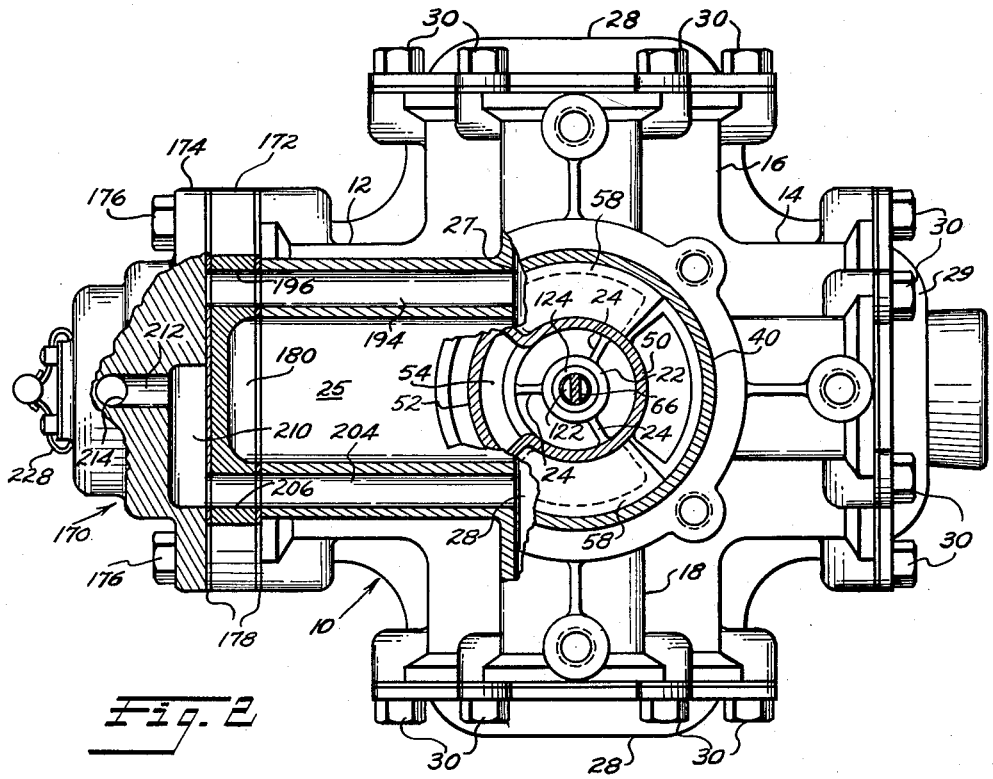
Figure 2 is a horizontal sectional view taken substantially along the line 2—2 of Figure 1 showing the connecting passageways between the calibration device and one pair of the piston cylinders.
Figure 4:
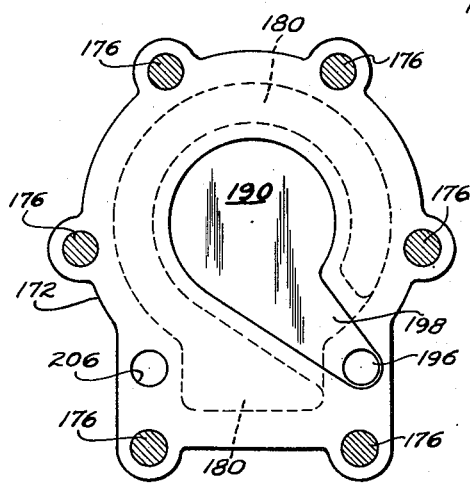
Figure 4 is a fragmentary sectional view of the calibration unit taken along line 4—4 of Figure 1.

As shown in Figures 1, 2 and 4, fluid communication is established between chamber 192 and the inner end of passage 27 leading to the outer end of cylinder 16, through a passage 194 formed in the lower surface of cylinder block 12 which is in register with a port 196 in head 172 communicating with an extension 198 of the recess 190.

Figure 5:
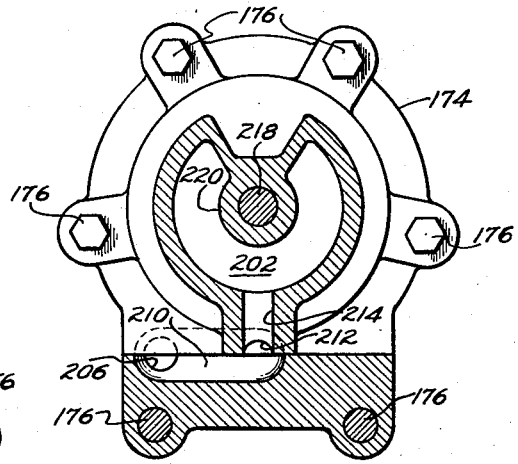
Figure 5 is a similar view taken along line 5—5 of Figure 1.

As shown in Figures 1 and 5, a chamber 200, formed at the outer cupped surface of piston 188, includes a portion of the recess 182 and an arcuate recess 202 formed in the plate 174 as a reduced extension of a portion of the recess 182. The chamber 200 is in communication with the inner end of the passage 28 connected with the outer end of cylinder 18 through a passage 204 in cylinder block 12, port 206 in head 172, an elongated recess 210 in cover 274 and communicating passages 212 and 214 in the cover 174; the latter terminating in recess 202. The lower end of the drilled passage 214 is closed by a threaded plug 216. It is to be noted that the passages 194 and 204 are, in effect, directly connected with the inlet and outlet passages formed in the valve 48 so that the operating pressures of the same magnitude are transmitted simultaneously to the calibration and meter pistons.

The stroke of the piston 188 and the quantity of fluid expelled from chambers 192 and 200 during the reciprocation of the piston may be adjusted by lateral movement of a screw 218 threaded into a boss 220 in the cover 174. Leakage between the screw 218 and the boss 220 is prevented by an O ring 221. A screw 222 extends through the boss 220 onto the screw 218 to lock the latter in its adjusted position. The outer end of the boss 220 is closed by a cover plate 224 attached to the boss by screws 226. Holes are provided in the heads of the cover screws 226 and the locking screw 222 to receive a sealed lockwire 228 to prevent unauthorized adjustment of the calibration unit.

The operation of the meter is as follows:

With coupling 88 connected to suitable source of fluid under pressure and passage 136 connected to a low pressure outlet and the valve member 48 in the position shown in Figure 1, fluid under pressure will flow through the inlet chamber 42 through the opening in plate 36 and the passage 26 to the outer end of cylinder 14. The valve member 48 simultaneously connects the passage 25 leading to the outer end of cylinder 12 with the central chamber 56 and the outlet 136. Since the pistons in the opposed cylinders 12 and 14 are rigidly connected to move as a unit, as the liquid pressure in the cylinder 14 forces the piston therein to the left, the piston in the cylinder 12 moves correspondingly therewith and thus forces liquid out through the passage 25, the chamber 56, and the outlet 136. As the pistons are operatively connected with the valve 48, the valve is rotated in properly timed relation with the reciprocation of the pistons to alternately connect the passages 25, 26, 27 and 28 of the opposed cylinders with the inlet and outlet sides, respectively, of the meter in proper sequence.

In the operation of the meter the passages 194 and 204 and the portions of the calibration cylinder not occupied by the piston and the adjusting means are filled with liquid. When valve 48 establishes communication through the passage 27 between the valve inlet chamber and the meter cylinder 16, the cylinder 18 is connected to the meter outlet through the passage 28 and the valve chamber 56, and the higher inlet pressure is effective through passage 194 and the chamber 192 to move the adjustment piston rapidly into contact with the adjustment screw 218 and thereby discharge liquid from the chamber 200 through passage 204 into the outlet chamber 56 of the valve along with the liquid discharged into the outlet from the cylinder 18. When the position of the meter valve 48 is reversed, the higher inlet pressure will then be applied to chamber 200 through the passage 204, thus quickly displacing the calibration piston in the opposite direction into contact with the cylinder head 172, and expelling liquid from chamber 192 through passage 194 into the chamber 56 of the valve along with the liquid discharged by the cylinder 16. By the adjustment of the screw 218, the amount of liquid which is discharged through the passages 194 and 204 into the meter outlet at each stroke of the piston 188 may be predetermined as desired thus calibrating the entire meter to discharge a predetermined volume of liquid per cycle of the meter.

The above described meter is particularly effective in installations which require accurate metering under low flow condition. Friction losses throughout the meter are held to a minimum. The calibration piston, being made of graphite, is lightweight and self lubricating. The differential pressure which actuates the calibration piston is established over a large area of the piston thus assuring a full stroke of the piston even when the relatively low operating pressures associated with low flow conditions are present. The meter thus delivers the calibrated amount of fluid under any operating pressure sufficient to drive the meter.

Further, the calibration unit is extremely compact and because of the novel incorporation of the unit in the meter does not materially increase the size and weight of the meter.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a fluid meter having a cylinder block having inlet and outlet passages, a plurality of pairs of opposed meter cylinders in said block having meter pistons reciprocably received therein, and a meter piston actuated valve for connecting said cylinders sequentially to said inlet and outlet passages; a calibration device for said meter comprising; a calibration cylinder, a plate secured to said cylinder block and having recesses in its opposite faces forming the head respectively of said calibration cylinder and one of said meter cylinders, a free piston mounted for reciprocation in said calibration cylinder, the diameter of said piston being greater than its thickness, means forming passageways connecting opposite ends of said calibration cylinder respectively to said inlet and outlet passages when one of said pair of pistons is so connected, whereby said calibration piston will discharge a predetermined amount of fluid into said outlet passage along with the fluid discharged by said one of said meter pistons connected to said outlet passage.

2. In a piston meter having a cylinder block provided with inlet and outlet passages, pairs of opposed meter pistons reciprocably mounted in opposed meter cylinders in said cylinder block, and a piston actuated valve for connecting said cylinders sequentially to said inlet and outlet passages; a calibration device, comprising; a calibration cylinder housing in axial alignment with one of said meter cylinders and attached to said cylinder block, a plate sealingly clamped between said housing and said block having recesses in its opposite faces forming the end of the said calibration cylinder and the end of said one of said meter cylinders, a calibration piston in said calibration cylinder, the diameter of said piston being greater than its thickness, there being, a pair of conduits in the wall of said one cylinder terminating at their inner ends in ports selectively connected by said valve to said inlet and outlet passages when a pair of meter pistons are so connected, said housing and said plate having passages connecting the opposite ends of said calibration cylinder to the respective conduits whereby opposite sides of said calibration piston are connected to the inlet and outlet passages simultaneously with the pair of meter pistons so that a predetermined amount of fluid will be expelled from said calibration cylinder along with each discharge of fluid from each of said last mentioned pair of meter pistons.

3. The combination of claim 2 together with means adjustably extending through said housing into said calibration cylinder for adjusting the stroke of said calibration piston.

4. In a fluid meter, a cylinder block having an inlet port and outlet chamber substantially centrally disposed therein, first and second pairs of opposed cylinders in said block, pistons reciprocably received in said cylinders, a crank shaft operatively connected to said pistons, said cylinder block having a plurality of separate fluid passages each communicating with the outer end of one of said cylinders and each adapted to permit the passage of fluid to and away from said cylinder and terminating in a valve seat, a rotary valve operably connected with said crank shaft to connect said fluid passages alternately with said inlet port and said outlet chamber, a calibration unit comprising a housing rigidly attached to one of said first pair of cylinders, said housing having a cylindrical recess in longitudinal alignment with said one of said cylinders, a calibration piston reciprocably received in said recess, said piston having a diameter greater than its thickness and stroke, a plate clamped between said one of said cylinders and said housing to close the cylinder and said recess, the wall of said one of said cylinders having a pair of conduits therein communicating at their inner ends with the inner ends of the pair of passages communicating with said second pair of opposed cylinders, said housing and said plate having passages connecting opposite sides of said calibration piston with the respective conduits whereby said calibration piston is actuated by the pressure differential in said conduit and discharges a predetermined quantity of fluid into said outlet chamber with each discharge of fluid from each of the associated pair of fluid passages.

5. In a fluid meter having a first and second pair of opposed cylinders, pistons mounted in said cylinders, a plurality of separate fluid conduits each communicating with the outer end of one of said cylinders and each adapted to permit the passage of fluid to and away from said cylinders, and means for sequentially connecting said cylinders through said conduits alternately with a source of fluid under pressure and exhaust, a calibration unit comprising; a housing rigidly attached to one of said first pair of cylinders and forming a continuation thereof, said housing having a cylindrical recess, a calibration piston received in said recess, said piston having a diameter greater than its thickness, a plate clamped between said housing and the adjacent cylinder, said plate having opposed recesses forming a continuation of said recess in said housing and said adjacent cylinder, there being a pair of fluid passages formed in the wall of said adjacent cylinder terminating at their inner ends in said separate fluid conduits connected with said second pair of cylinders, said plate and said housing having registering passages connecting one of said passages in said cylinder wall with one side of said piston and connecting the other of said passages in said wall with the other side of said piston whereby said calibration piston will be actuated by the pressure differential between the said passages in cylinder wall to discharge the predetermined quantity of fluid to exhaust with each discharge of fluid from each of said second pair of meter cylinders.

GEORGE E. BATCHELDER.

References Cited in the file of this patent

UNITED STATES PATENTS

| Number | Name | Date |
|---|---|---|
| 1,949,006 | Brubaker | Feb. 27, 1934 |
| 2,042,767 | Brubaker | June 2, 1936 |
| 2,103,482 | McCandless | Dec. 28, 1937 |
| 2,163,794 | McCandless | June 27, 1939 |

FOREIGN PATENTS

| Number | Country | Date |
|---|---|---|
| 467,120 | Great Britain | June 11, 1937 |